United States Patent [19]
Yang

[11] Patent Number: 5,690,312
[45] Date of Patent: Nov. 25, 1997

[54] FAUCET CONTROL MECHANISM

[76] Inventor: Ho Fa Yang, P.O. Box 63-99, Taichung, Taiwan

[21] Appl. No.: 717,440

[22] Filed: Sep. 20, 1996

[51] Int. Cl.$^6$ ........................................ F16K 1/00
[52] U.S. Cl. ............................. 251/321; 137/801
[58] Field of Search ........................ 137/801; 251/321

[56] References Cited

U.S. PATENT DOCUMENTS

| | | | |
|---|---|---|---|
| 2,144,427 | 1/1939 | Longstreet | 251/321 |
| 2,612,342 | 9/1952 | Terry | 251/321 X |
| 4,084,620 | 4/1978 | Bucknell et al. | 137/801 |

Primary Examiner—John Fox

[57] ABSTRACT

A faucet includes an upper portion having an extension extended in a bore and includes a rear portion having four chambers of different sizes. The upper portion includes an inlet and an outlet for allowing water to flow into the bore. A barrel is engaged in one of the chambers and includes a notch communicating with the inlet and includes a valve seat. A valve stem is slidably engaged in the barrel and includes a plug for engaging with the valve seat of the barrel. A knob is secured to the valve stem for disengaging the plug from the valve seat.

2 Claims, 2 Drawing Sheets

5,690,312

FAUCET CONTROL MECHANISM

BACKGROUND OF THE INVENTION

1. Field of the Invention

The present invention relates to a faucet, and more particularly to a faucet control mechanism.

2. Description of the Prior Art

Typical faucets comprise a valve stem slidably engaged in the faucet for engaging with a valve seat and for controlling the water flow of the faucet. However, typical faucets comprise a configuration that may not be easily operated.

The present invention has arisen to mitigate and/or obviate the afore-described disadvantages of the conventional faucets.

SUMMARY OF THE INVENTION

The primary objective of the present invention is to provide a faucet control mechanism which may be easily and effectively operated by the user.

In accordance with one aspect of the invention, there is provided a faucet comprising a body including an upper portion having a bore and having an extension and having a rear portion, the body including a vertical portion extended from the rear portion which includes a first chamber, a second chamber, a third chamber and a fourth chamber formed therein, the body including a projection extended inward of the second chamber and including an inlet communicating the second chamber with the vertical portion, the body including an outlet for communicating the rear portion of the body with the bore of the upper portion and for allowing water to flow into the bore, a nozzle member secured to the extension and received in the bore of the upper portion of the body, a cap secured to the front portion of the upper portion, a spring engaged in the first chamber, a barrel engaged in the second chamber of the body and including a notch for engaging with the projection and for preventing the barrel from rotating relative to the body, the notch communicating with the inlet for allowing water to flow into the barrel, the barrel including a protrusion engaged in the third chamber and having an aperture formed therein, the protrusion including at least one passage formed therein, the barrel including a valve seat formed therein, a cover engaged in the fourth chamber and including a ring engaged in the third chamber and engaged with the protrusion of the barrel, a valve stem slidably engaged in the barrel and including a front portion for engaging with the spring and including a rear portion for engaging with the aperture of the barrel, the valve stem including a middle portion having a plug for engaging with the valve seat of the barrel, and a knob secured to the rear portion of the valve stem and moved in concert with the valve stem. The plug is moved against the spring by the knob for disengaging the plug from the valve seat and for allowing water from the inlet to flow through the valve seat and the passage of the protrusion and the outlet and to flow into the bore.

The cover includes a rear portion having an annular flange extended radially outward therefrom, the faucet includes a shield having an annular rib engaged with the annular flange of the cover.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
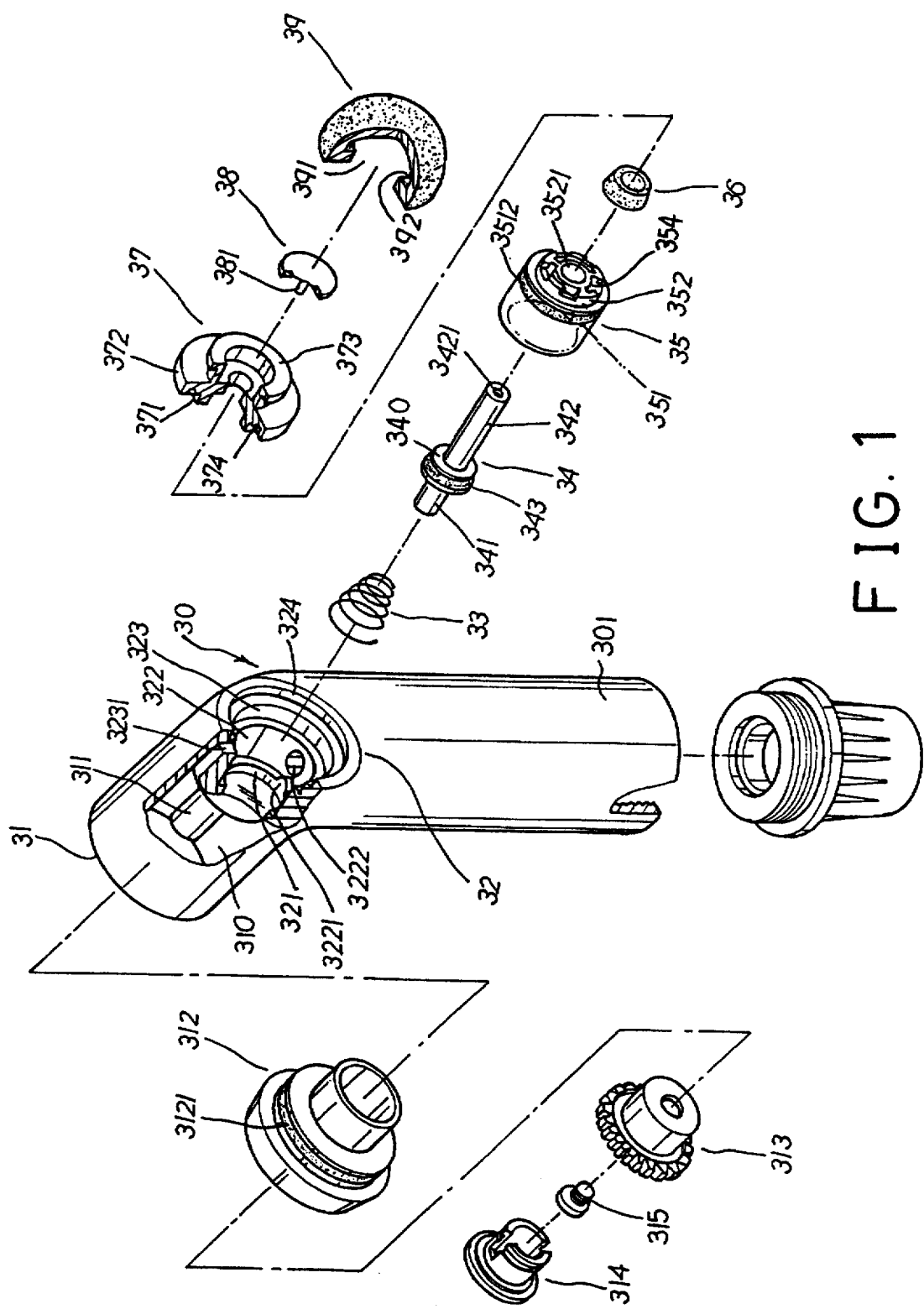
FIG. 1 is an exploded view of a faucet in accordance with the present invention.
Figure 2:
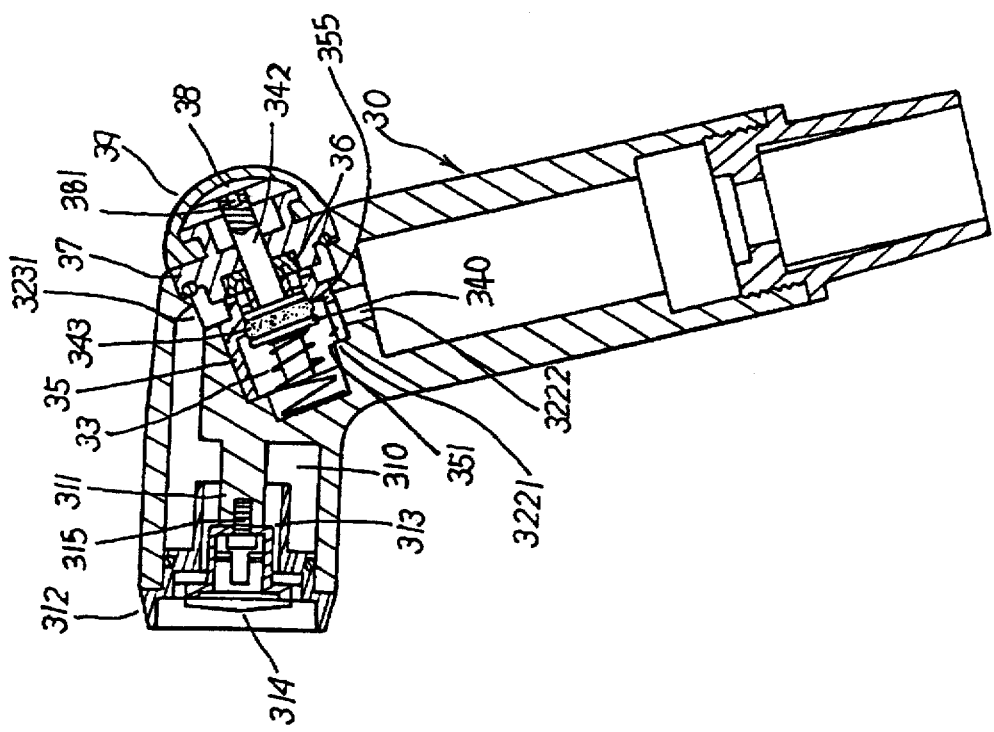

Referring to the drawings, and initially to FIGS. 1 and 2, a faucet in accordance with the present invention comprises a body 30 including an upper portion 31 having a bore 310 formed therein and having an extension 311 provided therein. The body 30 includes a vertical portion 301 having a coupler 302 secured to the bottom for securing to the basin or the sink. A nozzle member 313 is secured to the extension 311 by a fastening screw 315. A cap 312 is secured to the front portion of the upper portion 31 and includes a sealing ring 3121 engaged with the front portion 31 for making a water tight seal therebetween. A lid 314 is secured to the front portion of the nozzle member 313.

The body 30 includes a rear portion 32 having a stepped hole 321, 322, 323, 324 formed therein. The stepped hole includes a first chamber 321 of smallest size for receiving a spring 33, a second chamber 322 of middle size for receiving a barrel 35, a third chamber 323 of large size, and a fourth chamber 324 of the largest size for receiving the peripheral wall 372 of a cover 37. The body 30 includes a projection 3221 formed therein and extended inward of the second chamber 322 and includes an inlet 3222 communicating the stepped hole with the interior of the vertical portion 301. The barrel 35 includes a notch 351 for engaging with the projection 3221 and for preventing the barrel 35 from rotating relative to the body 30. The notch 351 is large enough for communicating with the inlet 3222 and for allowing the water to flow into the barrel 35. The body 30 includes an outlet 3231 for communicating the stepped hole with the bore 310 of the upper portion 31 and for allowing water to flow into the bore 310.

Figure 3:
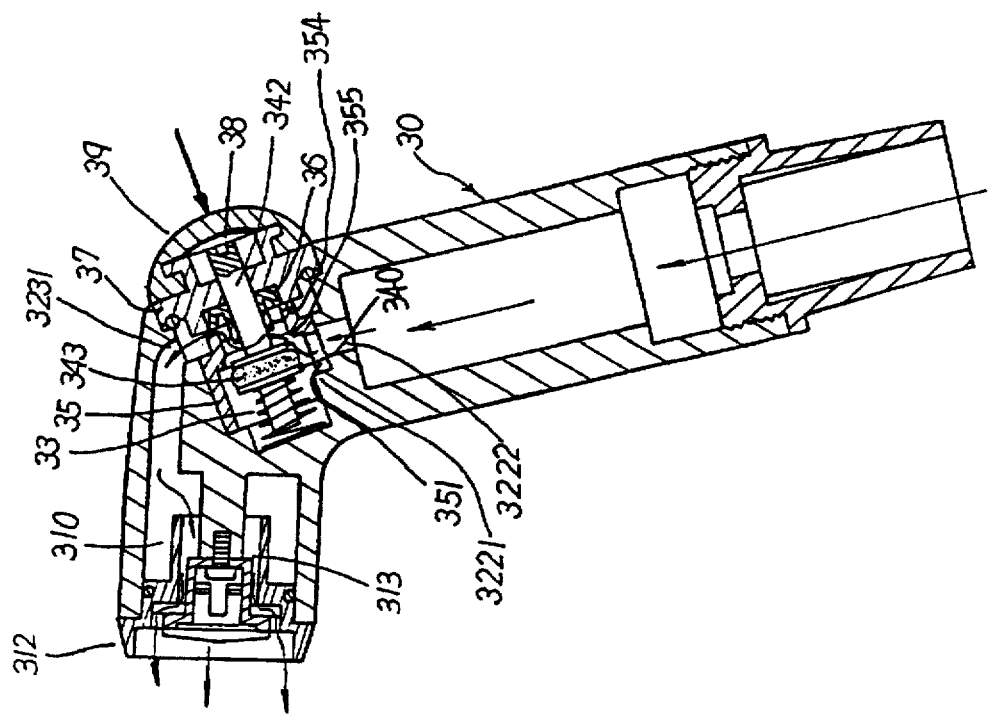
FIGS. 2 and 3 are cross sectional views illustrating the operation of the faucet.

The barrel 35 includes a protrusion 352 of reduced size and having an aperture 3521 formed therein. The protrusion 352 includes one or more passages 354 formed therein. The barrel 35 includes a sealing ring 3512 engaged on the outer peripheral portion for making a water tight seal with the body 30. The cover 37 includes a ring 371 for receiving a gasket 36 therein and for engaging with the protrusion 352 of the barrel 35 (FIGS. 2 and 3). The ring 371 and the protrusion 352 are engaged in the third chamber 323 of the rear portion 32 of the body 30. A sealing ring 374 is engaged in the cover 37 and engaged between the cover 37 and the rear portion 32 of the body 30 so as to make a water tight seal. The cover 37 includes an annular flange 373 extended radially outward from the front portion. The barrel 35 includes a valve seat 355 formed in the inner portion (FIGS. 2, 3).

A valve stem 34 is slidably engaged in the barrel 35 and includes a front portion 341 for engaging with the spring 33 and includes a rear portion 342 for engaging with the aperture 3521 of the barrel 35. A plug 340 is secured on the valve stem 34 and includes a sealing ring 343 engaged thereon for engaging with the valve seat 355 of the barrel 35 and for controlling the water flow path. The rear portion 342 of the valve stem 34 includes a hole 3421. A knob 38 includes a pin 381 extended therefrom and engaged with the hole 3421 of the valve stem 34 so as to be secured to the valve stem 34 and so as to be moved in concert with the valve stem 34. The plug 340 may be moved against the spring 33 by the knob 38 so as to be disengaged from the valve seat 355. As best shown in FIG. 3, when the plug 340 is disengaged from the valve seat 355, the water from the inlet 3222 may flow through the valve seat 355 and the passages 354 of the protrusion 352 and the outlet 3231 such that the water may flow into the bore 310 and may flow out through the nozzle member 313. A shield 39 of resilient material includes an opening 391 for engaging with the annular flange 373 of the cover 37 and includes an annular rib 392 extended radially inward for engaging with the annular flange 373 and for securing the shield 39 to the cover 37.

It is to be noted that the plug 340 and the valve stem 34 may be directly moved against the spring 33 by the knob 38 when the knob 38 is depressed by the user such that the faucet may be easily and effectively operated by the user.

Accordingly, the faucet in accordance with the present invention includes a configuration that may be easily and effectively operated by the user.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A faucet comprising:

a body including an upper portion having a bore formed therein and having an extension provided therein, said upper portion including a rear portion, said body including a vertical portion extended from said rear portion of said upper portion, said rear portion of said body including a first chamber, a second chamber, a third chamber and a fourth chamber formed therein, said body including a projection formed therein and extended inward of said second chamber and including an inlet communicating said second chamber with said vertical portion, said body including an outlet for communicating said rear portion of said body with said bore of said upper portion and for allowing water to flow into said bore, a nozzle member secured to said extension and received in said bore of said upper portion of said body, a cap secured to said front portion of said upper portion, a spring engaged in said first chamber, a barrel engaged in said second chamber of said body and including a notch for engaging with said projection and for preventing said barrel from rotating relative to said body, said notch being communicating with said inlet and for allowing water to flow into said barrel, said barrel including a protrusion engaged in said third chamber and having an aperture formed therein, said protrusion including at least one passage formed therein, said barrel including a valve seat formed therein, a cover engaged in said fourth chamber and including a ring engaged in said third chamber and engaged with said protrusion of said barrel, a valve stem slidably engaged in said barrel and including a front portion for engaging with said spring and including a rear portion for engaging with said aperture of said barrel, said valve stem including a middle portion having a plug secured thereon for engaging with said valve seat of said barrel, and a knob secured to said rear portion of said valve stem for being secured to said valve stem and for moving in concert with said valve stem, said plug being moved against said spring by said knob for disengaging said plug from said valve seat and for allowing water from said inlet to flow through said valve seat and said passage of said protrusion and said outlet and to flow into said bore.

2. A faucet according to claim 1, wherein said cover includes a rear portion having an annular flange extended radially outward therefrom, said faucet includes a shield having an annular rib engaged with said annular flange of said cover.

* * * * *